United States Patent

Gilbert et al.

[11] Patent Number: 5,396,544
[45] Date of Patent: Mar. 7, 1995

[54] TELEPHONE ANSWERING SYSTEM

[75] Inventors: Wayne Gilbert, Honolulu, Hi.; Kazuyoshi Imazeki; Nobuaki Yokoyama, both of Tokyo, Japan

[73] Assignee: General Research of Electronics, Inc., Tokyo, Japan

[21] Appl. No.: 142,719

[22] Filed: Oct. 25, 1993

[51] Int. Cl.6 .................................. H04M 1/64
[52] U.S. Cl. ........................ 379/67; 379/74; 379/84; 379/211
[58] Field of Search .............. 379/74, 75, 76, 77, 379/78, 79, 70, 71, 72, 80, 81, 82, 83, 84, 85, 211, 214, 215

[56] References Cited

U.S. PATENT DOCUMENTS

| | | | |
|---|---|---|---|
| 4,306,117 | 12/1981 | Jacobson | 379/76 |
| 4,515,995 | 5/1985 | Bolick | 379/76 |
| 4,596,901 | 6/1986 | Hanscom | 379/76 |
| 4,608,458 | 8/1986 | Hashimoto | 379/79 |
| 4,723,273 | 2/1988 | Diesel | 379/211 |
| 4,841,566 | 6/1989 | Lott | 379/393 |
| 4,969,182 | 11/1990 | Ohtsubo | 379/67 |
| 5,159,626 | 10/1992 | Baum | 379/79 |

Primary Examiner—James L. Dwyer
Assistant Examiner—Michael N. Lau
Attorney, Agent, or Firm—Trexler, Bushnell, Giangiorgi & Blackstone, Ltd.

[57] ABSTRACT

A telephone answering apparatus permits a called party to select between an automatic mode wherein a message is automatically played back to a caller without any action of the called party and a prenouncer mode wherein a message is played back to the caller when activated by the called party. The telephone answering apparatus includes a ring detector circuit connectable to an outside line and responsive to an incoming call on the outside line for producing a ring detected signal, a timer and driver circuit responsive to the ring detected signal for producing a playback signal and a manually actuatable answer switch. A mode switch capable of selecting one of the prenouncer mode and the automatic mode is connected to the timer and driver circuit, to the ring detector circuit and to the answer switch.

8 Claims, 2 Drawing Sheets

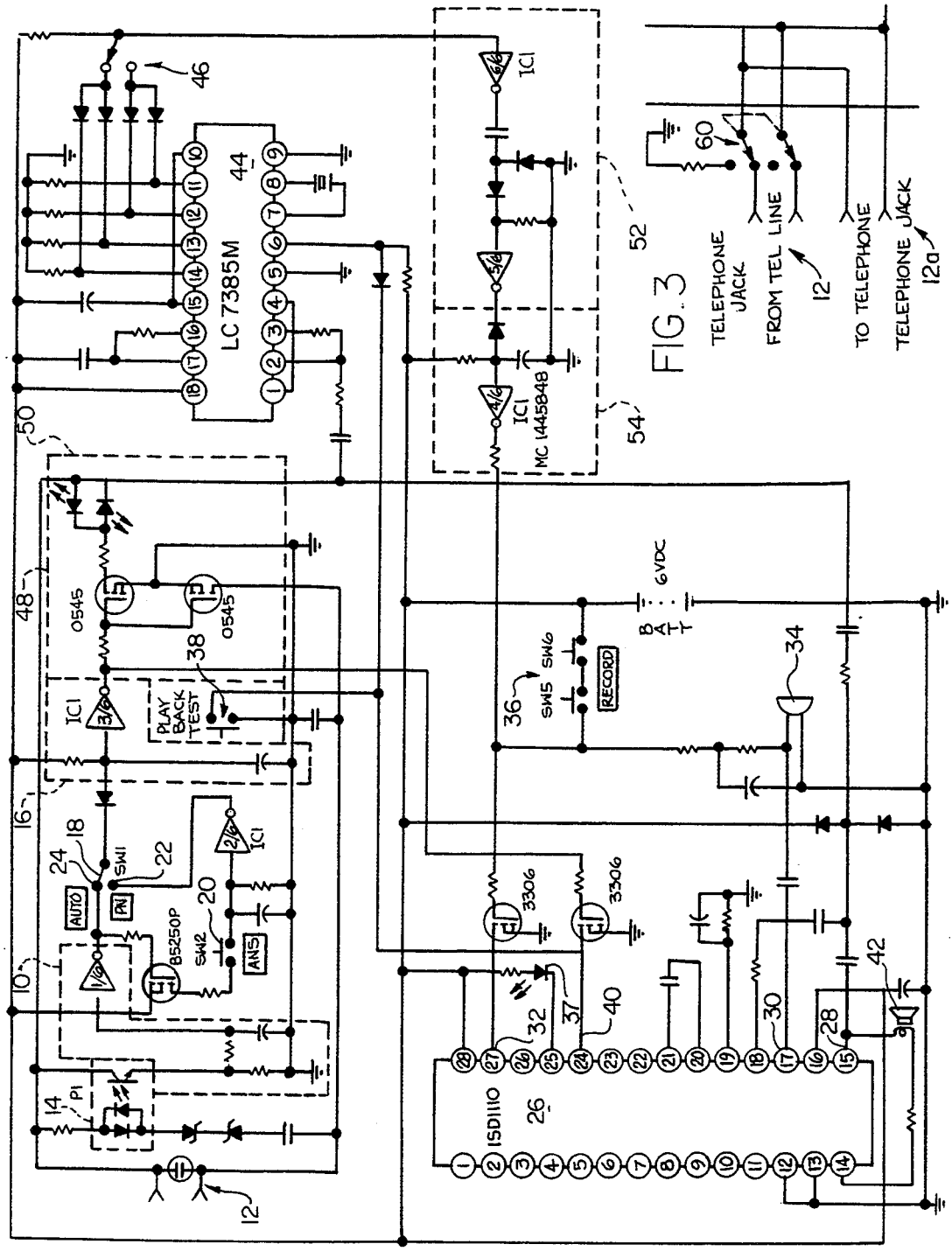

TELEPHONE ANSWERING SYSTEM

BACKGROUND OF THE INVENTION

This invention is directed generally to the field of telephone related equipment and more particularly to a novel and improved telephone answering system.

Telephone answering systems heretofore proposed include numerous tape-based systems in which audio tape cassettes of various sizes are utilized to record both outgoing and incoming messages. However, such systems generally require either that the answering machine respond to incoming calls or that the user override the answering machine by either switching off the machine or by answering an incoming call prior to a predetermined, and sometimes selectable, number of rings. Such systems generally require the user to interrupt and disable the answering machine, if it is desired to respond to the telephone call subsequent to answering by the machine. This generally requires stopping and rewinding of the tape cassette in the machine to the beginning of a prerecorded answering message. If this is not done, the machine will play back its prerecorded message and then begin to record the conversation.

Moreover, upon each answering of a phone call by such a machine and recording of an incoming message, if desired by the caller, the answering machine must again rewind the tape to the beginning of the answering or outgoing message. This can result in the phone line being unavailable to other callers for a period of time while the recording and rewinding operation is taking place.

Such tape based systems offer a limited amount of space for recording messages from callers. Often, listening to such messages and obtaining useful information is difficult, since many callers leave insufficient information. If the caller and his location can be identified, a return call many be placed, however, some callers do not leave sufficient information to successfully reach them by a return call. Also, listening to many such messages and placing return calls can be overly time consuming and bothersome.

While rerecording of the answering message or changing of the existing answering message is possible with such machines, the operation can be somewhat cumbersome, requiring rewinding of the tape, depressing of suitable controls, and the like to record a new outgoing or answering message. Larger and more complex message or voice mail systems for use in business generally require a large amount of relatively sophisticated and expensive equipment for performing the foregoing functions on a number of lines, permitting dual tone multifrequency (DTMF), or so-called "touch-tone" activation or interaction for selection of various lines and/or prerecorded messages and the like. However, such sophisticated and expensive systems are generally too cumbersome, expensive and impractical for use by small businesses or individuals.

The present invention concerns a novel telephone answering system which provides for two modes of operation, which have been termed the prenouncer mode and the automatic mode. In the prenouncer mode, when an incoming call is received, the pressing of a manual pushbutton or other switch causes the incoming call to be placed on hold and an outgoing voice message to be given to the calling party. In the automatic mode of operation, the system of the invention answers the incoming call automatically, places the call on hold and gives the outgoing voice message to the calling party. The outgoing message is prerecorded and can be any message of the user's choice. Moreover, the user can readily change the outgoing message relatively quickly and simply.

The outgoing message can be reviewed and changed either directly at the device, by means of a telephone set coupled to the device, or over the outside line from any telephone by calling the line to which the answering system of the invention is connected. In this latter instance, entry of a predetermined DTMF code permits any desired message to be recorded.

The prenouncer mode is useful in a number of situations, for example when in a noisy location such as a room where many people are talking or where a TV or music is playing. In the prenouncer mode, one can press an "answer" button, causing the system of the invention to answer the call with a previously recorded message such as "I am at a noisy location, please hold for a moment until I get to a phone in a quieter location" and place the call on hold. Similarly, in a business, the message might be "I am in the shop, please hold for a moment and I will answer your call in the office". In a business or home with two or more outside telephone lines, if a second call comes in while talking on one of the lines, one can press the answer button which will then answer the second call and send a prerecorded voice message such as "I am talking on another line, please hold a few moments and I will be with you".

In the automatic mode of operation, the system of the invention automatically answers and sends out a prerecorded message. However, because the message can be very quickly and simply changed, the system of the invention can be used to leave a very personalized or particular message. For example, one can record an appropriate message immediately prior to going to lunch. This message can advise callers that you are at lunch and what time you expect to be back to take telephone calls, for example: "This is Joe. I have taken a late lunch. I will be back at 1:45". Moreover, with the system of the invention, if the user finds that he will not be able to keep the schedule indicated on the previously recorded message, he can go to any phone and change the message by dialing the line to which the system of the invention is connected. The message can be changed by allowing the system to answer and play back the previously recorded message, then dialing a preselected DTMF record code and speaking into the telephone to record a new message, for example: "This is Joe. I have taken a late lunch. I will be back at 2:30".

OBJECTS AND SUMMARY OF THE INVENTION

Accordingly, it is a general object of this invention to provide a novel and improved telephone answering system.

A related object is to provide a telephone answering system which is capable of storing a selected voice message and playing back the message to a caller either upon manual actuation or automatically, at the option of the user.

Briefly and in accordance with the foregoing, a telephone answering system in accordance with the invention permits a called party to select between an automatic mode wherein a message is automatically played back to a caller without any action of the called party and a prenouncer mode wherein a message is played back to the caller when activated by the called party. This telephone answering apparatus comprises a ring detector circuit connectable to an outside line and responsive to an incoming call on said outside line for producing a ring detected signal; a timer and driver circuit responsive to said ring detected signal for producing a playback signal; a manually actuatable answer switch; a mode switch capable of selecting one of a prenouncer mode and an automatic mode, said mode switch being connected to said timer and driver circuit, to said ring detector circuit and to said answer switch, said mode switch being operative in said automatic mode for connecting said ring detector circuit to said timer and driver circuit to deliver said ring detected signal thereto so as to produce said playback signal and thereby play back said message automatically in response to said ring detected signal without any action of the called party, and said mode switch being operative in said prenouncer mode for connecting said answer switch between said ring detector circuit and said timer and driver circuit for selectively connecting said ring detector circuit to said timer and driver circuit in response to manual activation of said answer switch by the called party to thereby deliver said ring detected signal to said timer and driver circuit so as to produce said playback signal and thereby play back said message; a message storage and playback device for storing a message and connected to said timer and driver circuit, and having a message output connectable to said outside line, said message storage and playback device being responsive to said playback signal for playing back said message at said message output thereof.

BRIEF DESCRIPTION OF THE DRAWINGS

The features of the present invention which are believed to be novel are set forth with particularity in the appended claims. The organization and manner of operation of the invention, together with further objects and advantages thereof may best be understood by reference to the following description, taken in connection with the accompanying drawings in which like reference numerals identify like elements, and in which:

FIG. 2 is a circuit schematic showing further details of the system of FIG. 1; and FIG. 3 is a partial circuit schematic illustrating an alternate form of a portion of the circuit of FIG. 2.

DETAILED DESCRIPTION OF THE ILLUSTRATED EMBODIMENT

Figure 1:
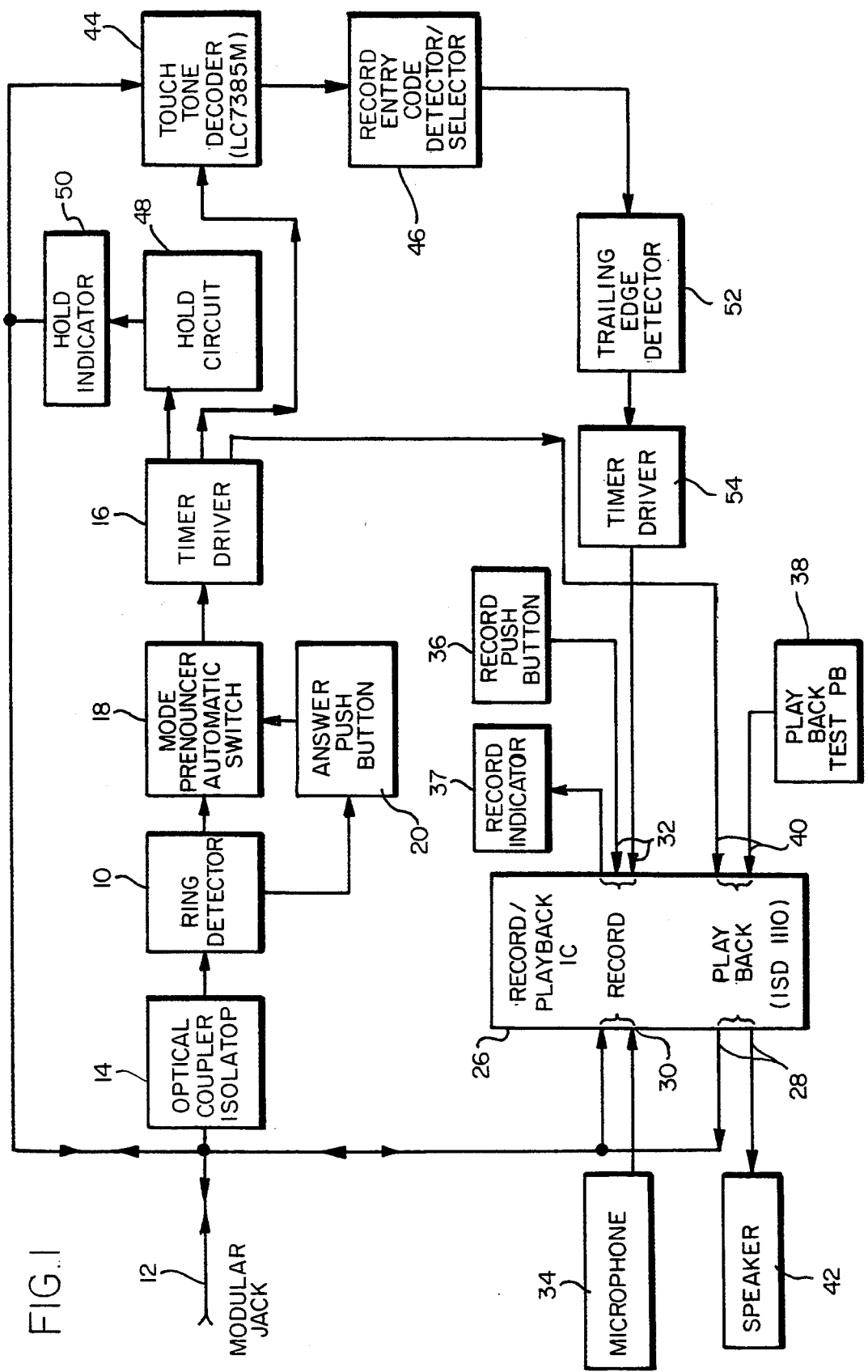
FIG. 1 is a functional block diagram of a telephone answering system in accordance with the invention.

Referring now to the drawings, and initially to FIGS. 1 and 2, a preferred embodiment of a telephone answering system in accordance with the invention is illustrated. The system of the invention includes a ring detector circuit 10 which is connected to a modular telephone jack 12 for connection to an outside telephone line. Preferably an optical coupler-isolator 14 is interposed between the ring detector circuit 10 and the modular jack 12. A timer/driver circuit 16 is operatively coupled with the ring detector circuit 10 through a mode switch 18.

Ring detector circuit 10 responds to an incoming call on an outside line by producing a ring detected signal. Cooperatively, the timer/driver circuit is responsive to a ring detected signal produced by the ring detector circuit 10 for producing a playback control signal. A manually actuatable answer switch, preferably in the form of a pushbutton type switch 20 is also coupled with the ring detector circuit 10 for selectively operatively coupling the ring detector circuit 10 to the timer/driver circuit 16 by way of the mode switch 18. Thus the ring detected signal may reach the timer/driver circuit 16 either directly by way of the mode switch 18 of by way of the answer pushbutton switch 20 and the mode switch 18.

In a first mode, which is referred to herein as the "prenouncer" mode, the mode switch 18 is switched to a contact 22 (see FIG. 2) such that manual activation of the answer pushbutton switch 20 is necessary to operatively couple the ring detector circuit to the timer/driver circuit and thus to deliver the ring detected signal to the timer/driver circuit. In a second mode, referred to herein as the "automatic" mode, the mode switch 18 is switched to a second contact 24, as illustrated in FIG. 2, for coupling the output of the ring detector circuit 10 directly to an input of the timer/driver circuit 16.

The timer/driver circuit 16 is also operatively coupled to a hold circuit 48 which places an incoming call at the telephone jack 12 on hold in response to the playback control signal produced by the timer/driver circuit 16. A hold indicator 50, preferably in the form of one or more LEDs is also preferably provided to indicate that a call has been received and placed on hold.

A message storage/playback means or circuit 26 is capable of storing a preselected, prerecorded message. This message storage/playback means 26 is also operatively coupled to the timer/driver circuit 16 and has a message output 28 which is coupled to the telephone jack 12 for connection to an outside telephone line. The message storage/playback circuit 26 is responsive to the playback signal produced by the timer/driver circuit 16 for playing back the message stored therein over its message output 28 and thus playing this message over an outside telephone line by way of the phone jack 12.

The message storage/playback means 26 further includes means for recording a message for storage and playback, and in this regard has a message input 30 and a record enable input 32. The message storage/playback means 26 is responsive to a record enable signal at the record enable input 32 for recording a message presented at the message input 30. In the illustrated embodiment, the message storage/playback means comprises a solid state integrated circuit'voice record/playback device or component. Preferably this integrated circuit comprises a NISD 1110 single-chip voice record/playback device available from Information Storage Devices of San Jose, Calif. Other equivalent devices may be utilized without departing from the invention.

In the embodiment illustrated in FIG. 2, a microphone 34 is also coupled to the message input 28. Cooperatively, a manually actuatable record switch means 36, illustrated as a pair of pushbutton switches, is operatively coupled to the record enable input 32, and is manually operative for producing a record enable signal. Thus, in operation a user may record a desired message in the device 26 by depressing the record enable switches 36 and speaking into the microphone 34. Preferably, a record indicator 37, which may take the form of an LED, is provided for indicating the receipt of a record enable signal at the input 32 of device 26.

Cooperatively, a playback test switch 38 is also provided in the embodiment illustrated in FIG. 2. This playback test switch 38 is operatively coupled to a playback control input 40 of the device 26 which is the same input which is operatively coupled to receive the playback control signal from the timer/driver circuit 16. The playback switch is capable of producing a similar playback control signal for causing the message stored in the device 26 to be played back over a loudspeaker 42 which may be coupled with the message output 28. Thus a new message may be recorded and reviewed utilizing the switches 36 and 38, the microphone 34 and the speaker 42.

The message input 30 is also operatively coupled to the telephone jack 12 and therefore connectable to an outside telephone line. In accordance with a further feature of the invention, means are provided to permit recording of a new message in the device 26 from any telephone, by way of an outside line connected to the telephone jack 12, by dialing the telephone to which the system of the invention is coupled at telephone jack 12. In this connection, a dual tone multifrequency (DTMF) or "touch tone" decoder circuit 44 is provided coupled to the telephone jack 12 and hence connectable to an outside line at the telephone jack 12. Preferably, the decoder 44 is comprises an integrated circuit dual tone multifrequency (DTMF) receiver of the type generally designated LC7385 available from Sanyo Electric Co., Ltd., Tokyo, Japan. The decoder 44 can decode DTMF signals received from the outside line at telephone jack 12 into a three state data output.

Cooperatively, the system of the invention further includes a record entry code detector/selector circuit 46 which is coupled with the decoded output of the DTMF decoder 44 and responsive to a predetermined decoded signal for producing the record enable signal. This latter circuit 46 is operatively coupled to the record enable input 32 of the device 26, to permit a new voice message received from the outside telephone line to be recorded and stored in the device 26. A trailing edge detector circuit 52 and a timer/driver circuit 54 are interposed between the code detector/selector circuit 46 and the record enable input 32.

Referring briefly to FIG. 3, in accordance with an alternate form of the invention, an additional record/test switch 60 is operatively coupled with the telephone jack 12 and with an input of the optical coupler/isolator 14. In the alternate embodiment of the system of the invention which utilizes the record/test switch 60 of FIG. 3, the microphone 34 and speaker 42 of FIG. 2 are not required and would be omitted. Instead, a telephone set can be coupled to a second telephone jack 12a provided in FIG. 3. The record/test switch may be activated to select the telephone set coupled to jack 12a, such that the telephone set at telephone jack 12a can be used in the same manner as described above for calling from an outside line to review the message recorded in the device 26 and to record a new message in the device 26.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A telephone answering apparatus for permitting a called party to select between an automatic mode wherein a message is automatically played back to a caller without any action of a called party and a prenouncer mode wherein a message is played back to the caller when activated by the called party, said telephone answering apparatus comprising: a ring detector circuit connectable to an outside line and responsive to an incoming call on said outside line for producing a ring detected signal; a timer and driver circuit responsive to said ring detected signal for producing a playback signal; a manually actuatable answer switch; a mode switch capable of selecting one of a prenouncer mode and an automatic mode, said mode switch being connected to said timer and driver circuit, to said ring detector circuit and to said answer switch, said mode switch being operative in said automatic mode for connecting said ring detector circuit to said timer and driver circuit to deliver said ring detected signal thereto so as to produce said playback signal and thereby play back said message automatically in response to said ring detected signal without any action of the called party, and said mode switch being operative in said prenouncer mode for connecting said answer switch between said ring detector circuit and said timer and driver circuit for selectively connecting said ring detector circuit to said timer and driver circuit in response to manual activation of said answer switch by the called party to thereby deliver said ring detected signal to said timer and driver circuit so as to produce said playback signal and thereby play back said message; a message storage and playback device for storing a message connected to said timer and driver circuit, and having a message output connectable to said outside line, said message storage and playback device being responsive to said playback signal for playing back said message at said message output thereof.

2. An apparatus according to claim 1 wherein said message storage and playback device includes a recording portion for recording a message for storage and playback, said recording portion having a message input and an enable input and being responsive to a record enable signal at said enable input for recording a message presented at said message input.

3. An apparatus according to claim 2 and further including a microphone connected to said message input and a manually actuatable record switch connected to said enable input for producing said record enable signal.

4. An apparatus according to claim 2 wherein said message input is also connectable to said outside line and further including a DTMF decoder circuit connectable to said outside line for decoding dual tone multifrequency signals received from said outside line and a record entry code selector connected to said DTMF decoder circuit and to said enable input and responsive to predetermined decoded signals for producing said record enable signal to thereby permit recording of a message from said outside line when a DTMF code selected by said record entry code selector is received from said outside line.

5. An apparatus according to claim 2 and further including a speaker connected to said message output and wherein said message storage and playback device further includes a playback enable input connected to receive said playback signal; and further including a manually actuatable playback test switch connected to said playback enable input for selectively producing a playback signal to thereby permit manually actuated playback of said stored message over said speaker.

6. An apparatus according to claim 5 and further including a microphone connected to said message input and a manually actuatable record switch connected to said enable input for producing said record enable signal to permit recording of a new message spoken into said microphone.

7. An apparatus according to claim 1 wherein said message storage and playback device comprises a solid state integrated circuit voice record and playback device.

8. An apparatus according to claim 4 and further including a record and test switch connected to said ring detector circuit and connectable to said outside line for selectively switching between said outside line and a phone set to permit use of a phone set for recording and playback of a message on said message storage and playback device.

* * * * *